US012515081B2

(12) United States Patent
Jacotey et al.

(10) Patent No.: US 12,515,081 B2
(45) Date of Patent: Jan. 6, 2026

(54) REGULATOR ASSEMBLY FOR AN AIRCREW BREATHING MASK

(71) Applicant: SAFRAN AEROTECHNICS, Plaisir (FR)

(72) Inventors: Jérémy Jacotey, Moissy-Cramayel (FR); Didier Lamourette, Moissy-Cramayel (FR); Serge Moreira, Moissy-Cramayel (FR)

(73) Assignee: SAFRAN AEROTECHNICS, Plaisir (FR)

( * ) Notice: Subject to any disclaimer, the term of this patent is extended or adjusted under 35 U.S.C. 154(b) by 565 days.

(21) Appl. No.: 18/006,714

(22) PCT Filed: Jul. 21, 2021

(86) PCT No.: PCT/EP2021/070450
§ 371 (c)(1),
(2) Date: Jan. 24, 2023

(87) PCT Pub. No.: WO2022/018169
PCT Pub. Date: Jan. 27, 2022

(65) Prior Publication Data

US 2023/0293916 A1 Sep. 21, 2023

(30) Foreign Application Priority Data

Jul. 24, 2020 (EP) .................................... 20305856

(51) Int. Cl.

| | |
|---|---|
| ***A62B 9/02*** | (2006.01) |
| ***A62B 7/14*** | (2006.01) |
| ***A62B 18/10*** | (2006.01) |

(52) U.S. Cl.
CPC .................. *A62B 9/02* (2013.01); *A62B 7/14* (2013.01); *A62B 18/10* (2013.01)

(58) Field of Classification Search
CPC .... A62B 7/14; A62B 9/00; A62B 9/02; A62B 18/10; F16K 35/02; F16K 35/027
See application file for complete search history.

(56) References Cited

U.S. PATENT DOCUMENTS

| | | | | |
|---|---|---|---|---|
| 6,260,819 B1 * | 7/2001 | Ovsepyan | F16K 35/06 | 251/95 |
| 2002/0073994 A1 * | 6/2002 | Patel | A62B 18/04 | 128/200.24 |

(Continued)

FOREIGN PATENT DOCUMENTS

| | | | | |
|---|---|---|---|---|
| EP | 2732833 A1 * | 5/2014 | A61M 1/74 | |
| EP | 2937113 A1 * | 10/2015 | A62B 7/14 | |

(Continued)

OTHER PUBLICATIONS

International Search Report mailed Nov. 3, 2021, issued in corresponding International Application No. PCT/EP2021/070450, filed Jul. 21, 2021, 5 pages.

(Continued)

*Primary Examiner* — Kathryn E Ditmer
(74) *Attorney, Agent, or Firm* — Christensen O'Connor Johnson Kindness PLLC

(57) ABSTRACT

A regulator assembly for an aircrew breathing mask is provided The regulator assembly includes a support, a mode selection knob movable between a first position, a second position and a third position, the mode selection knob comprising a base pivotably mounted on the support with respect to an axis of rotation, and a cover supported by the base. The cover can be movable relative to the base between a locked position of the mode selection knob and an unlocked position of the mode selection knob, the locked position locking the rotation of the mode selection knob from the second position to the third position, the unlocked (Continued)

position permitting rotation of the mode selection knob from the second position to the third position.

12 Claims, 8 Drawing Sheets

(56) References Cited

U.S. PATENT DOCUMENTS

| | | | | |
|---|---|---|---|---|
| 2012/0017914 | A1* | 1/2012 | Watt Lanyau ........ | A61M 16/04<br>128/207.14 |
| 2017/0235328 | A1* | 8/2017 | Swayne ................ | F16K 35/025<br>74/532 |

FOREIGN PATENT DOCUMENTS

| | | | | | |
|---|---|---|---|---|---|
| WO | 2009/066134 | A1 | | 5/2009 | |
| WO | WO-2017044582 | A1 | * | 3/2017 | ............... A62B 7/04 |

OTHER PUBLICATIONS

Written Opinion mailed Nov. 3, 2021, issued in corresponding International Application No. PCT/EP2021/070450, filed Jul. 21, 2021, 5 pages.

* cited by examiner

REGULATOR ASSEMBLY FOR AN AIRCREW BREATHING MASK

TECHNICAL FIELD OF THE INVENTION

The present disclosure relates to a regulator assembly for an aircrew breathing mask.

PRIOR ART

In a known manner, such a regulator assembly for an aircrew breathing mask, said assembly comprises:

a support, a mode selection knob able to be moved between at least a first position (EMER), a second position (100%) and a third position (N), the second position (100%) being positioned between the first position (EMER) and the third position (N), a regulator intended to be supplied by a breathing gas source and suited to supply a breathing cavity at least in the following three operating modes:

when the mode selection knob is in the first position (EMER), the regulator supplies the breathing cavity as long as the pressure in the breathing cavity is not higher than a first pressure relative to the ambient pressure, when the mode selection knob is in the second position (100%), the regulator supplies the breathing cavity as long as the pressure in the breathing cavity is not higher than a second pressure relative to the ambient pressure, the first pressure being higher than the second pressure, when the mode selection knob is in the third position (N), the regulator supplies the breathing cavity with breathing gas diluted with air.

The first position "EMER" corresponds to the "EMERGENCY" mode. It should be selected in case of smoke or fire in the cockpit. The second position "100%" corresponds to the "100%" mode. It provides protection against hypoxia. The third position "N" corresponds to the "NORMAL" mode. It allows limiting the oxygen consumption in preventive wear or over a descent profile level. The selection knob is by default in the second position 100%. The second position 100% is arranged at the center between the first position and the third position.

The mode selection knob is not visible to the user when the mask is worn. Currently, the selection knob is asymmetrical to enable the user to distinguish the direction of rotation leading to the "EMERGENCY" mode and to the "NORMAL" mode by touching. The selection knob also has lateral markings to enable verification of the selected mode by a third-party. Thus, current breathing masks include means giving information on the selected operating mode to the user, thanks to the asymmetry of the knob, and to third parties, using the lateral markings.

Despite this asymmetry, without significant knowledge and frequent use of the breathing mask, it is difficult to know the direction of rotation leading to the "EMERGENCY" mode and to the "NORMAL" mode. In particular, in the event of a sudden emergency, the user might accidentally make the selection knob pivot into the "NORMAL" mode and lose protection against toxic fumes and gases. The user might select the wrong operating mode if the information is poorly assimilated or if he reacts in haste.

PRESENTATION OF THE INVENTION

The present disclosure aims to propose a regulator assembly able to avoid an accidental selection of the "NORMAL" mode instead of the "EMERGENCY" mode. The present disclosure aims to increase the safety level of regulator assemblies for oxygen masks by preventing a wrong handling of the mode selection knob.

SUMMARY OF THE INVENTION

The invention relates to a regulator assembly as described hereinabove wherein the mode selection knob includes a base pivotably mounted on the support relative to an axis of rotation, and a cover supported by the base; said axis of rotation being perpendicular to the support and extending according to an axial direction; said cover being movable according to the axial direction relative to the base between a locked position of the mode selection knob and an unlocked position of the mode selection knob, the locked position locking the rotation of the mode selection knob from the second position to the third position, the unlocked position enabling the rotation of the mode selection knob from the second position to the third position.

Advantageously, the present disclosure allows mechanically preventing the selection of a wrong operating mode.

The features disclosed in the following paragraphs may, optionally, be implemented. They may be implemented independently of each other or in combination with each other:

Preferably, the support includes at least one axial projection, and wherein the cover includes a bottom, and at least one axial wall supported by the bottom, said at least one axial wall being able to abut against said at least one axial projection when the cover is positioned in the locked position and the mode selection knob is pivoted from the second position to the third position; said at least one axial wall being able to pivot away from said at least one axial projection when the cover is positioned in the unlocked position and the mode selection knob is pivoted from the second position to the third position.

Preferably, the base includes a plate extending parallel to the support; the bottom bearing against the plate when the mode selection knob is in the locked position; the base comprises a sliding device and the cover comprises a complementary sliding device cooperating with the sliding device to enable movement of the cover relative to the base according to the axial direction between the locked position and the unlocked position.

Preferably, the cover is able to be pulled in a direction directed outwards of the mode selection knob to set the cover into the unlocked position; and wherein said axial wall is able to pivot above said at least one axial projection when the cover is positioned in the unlocked position and the mode selection knob is pivoted from the second position to the third position. Preferably, said at least one axial wall borders only a portion of a peripheral edge of the bottom. Preferably, the cover includes two axial walls parallel to each other and parallel to a midplane, said midplane containing the axis of rotation.

Preferably, the support includes an additional axial projection disposed on one side of said midplane, said axial projection being disposed on the other side of said midplane, the axial projection being positioned such that the axial wall is disposed above the additional axial projection when the mode selection knob is positioned in the third position.

Preferably, said plate has only two peripheral flanges, at least one opening being arranged between the two peripheral flanges, and wherein said at least one axial wall of the cover covers said at least one opening; said at least one axial projection being able to pass throughout said at least one opening, when the cover is in the unlocked position and the mode selection knob is pivoted to the third position.

Preferably, the mode selection knob includes at least one elastic element able to act between the base and the cover to hold the cover in the locked position. Preferably, the sliding device includes at least one axial hole arranged in said plate, and wherein the complementary sliding device comprises at least one axial profiled section extending perpendicular to the bottom, said axial profiled section sliding in said axial hole, when the cover is moved from the locked position to the unlocked position. Preferably, the complementary sliding device comprises at least one support cap able to be fastened to a free end of said at least one axial profiled section, said axial profiled section having a diameter; the support cap having a diameter larger than the diameter of the axial profiled section, and wherein said elastic element bears on the one hand against said at least one support cap and on the other hand against said plate.

Preferably, said at least one axial profiled section has at least three branches which intersect, and wherein said at least one support cap includes legs able to be wedged between said branches of said at least one axial profiled section.

DETAILED DESCRIPTION OF THE INVENTION

The drawings and the description hereinafter contain certain elements essentially. Hence, they can not only serve to better understand the present disclosure, but also contribute to the definition thereof, where appropriate. In the description hereinbelow, the terms "above", "below", "right", "left" etc. are used with reference to FIG. 6 and are not limiting.

Figure 1:
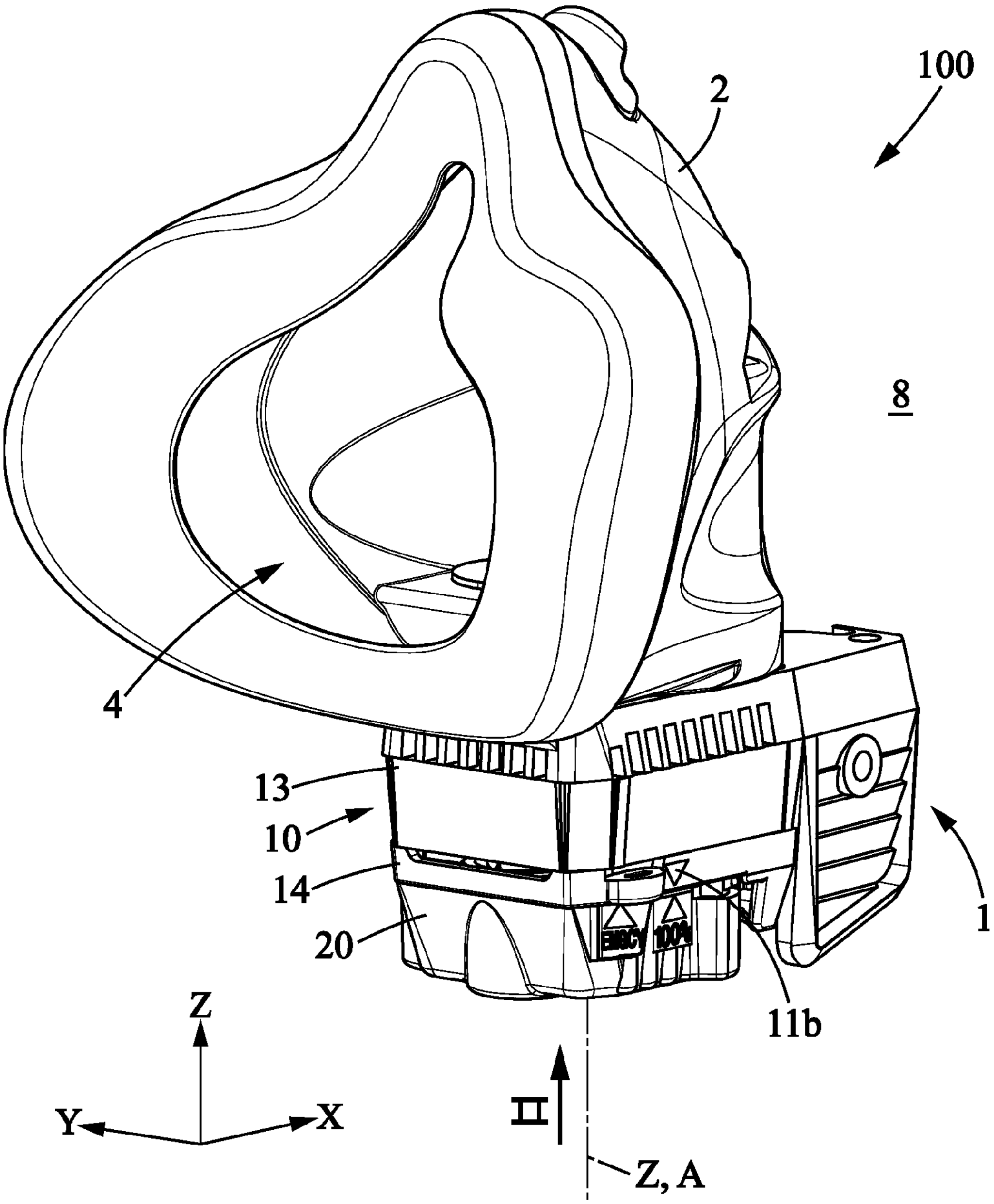
FIG. 1 is a perspective view of a breathing mask including a regulator assembly according to the present invention.
Figure 2:
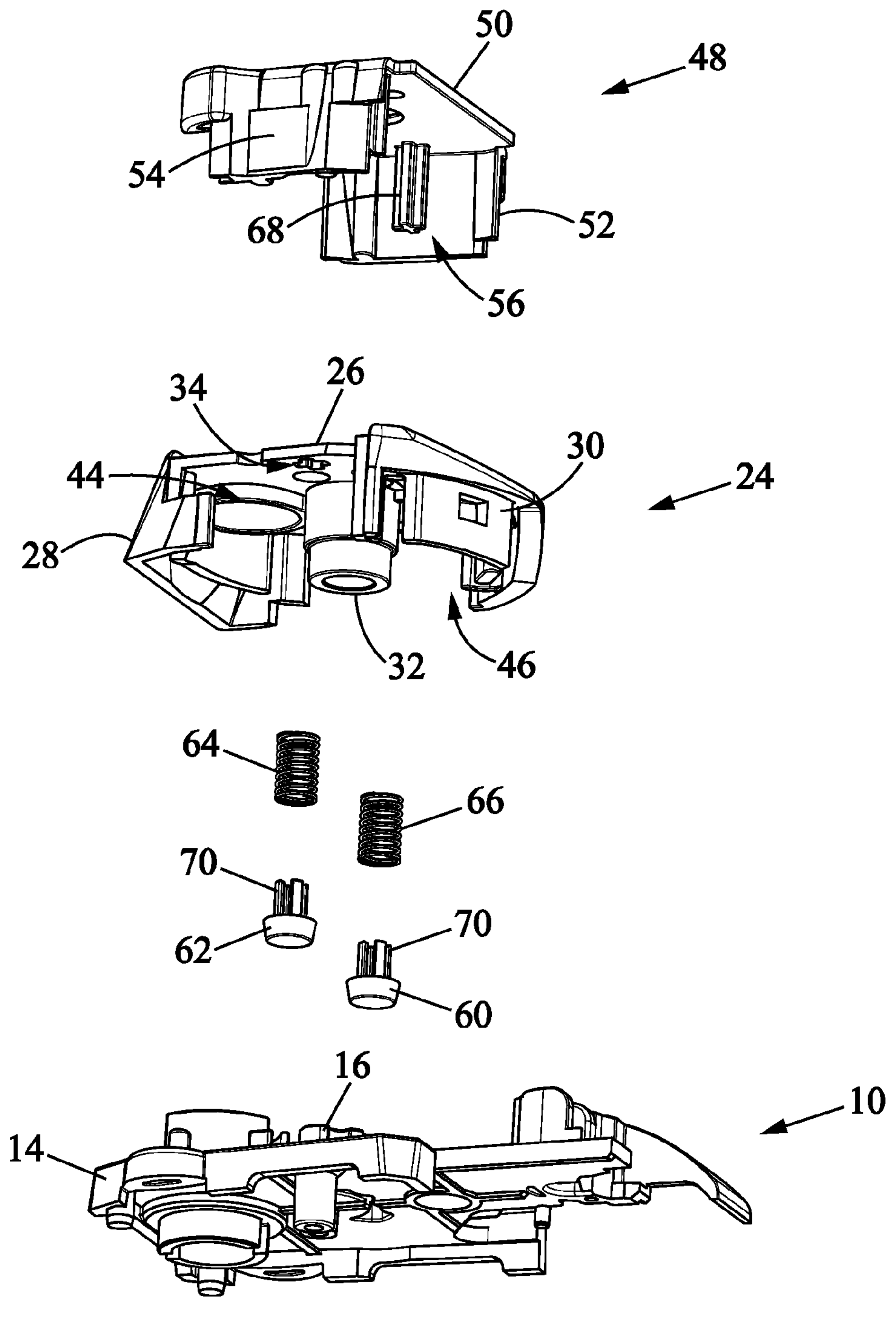
FIG. 2 is an exploded perspective view of the mode selection knob and of the support of the regulator assembly according to the invention.

FIG. 1 illustrates a breathing mask 100 disposed in a pressurized cabin 8 of a commercial aircraft intended to transport crew members and generally passengers too.

A device, preferably of the so-called isobaric type, pressurizes the cabin so that it is not lower than a pressurization pressure, generally corresponding to an altitude comprised between 1,500 meters and 2,400 meters. When the airplane rises, the pressure in the cabin is substantially equal to the pressure outside the cabin and decreases, until reaching said pressurization pressure. Under normal conditions, the pressure in the cabin is then kept constant until the pressure outside becomes lower than the pressurization pressure. The breathing mask is intended to enable its user to have enough oxygen and to be protected from harmful substances in the event of incidents, such as a depressurization, a presence of toxic gases or the like, preventing the occupants of the cabin from breathing normally.

The breathing mask 100 comprises a face cover 2 and a regulator assembly 1. The oronasal face cover 2 is intended to be applied in a substantially sealed manner on the face of a user around his nose and his mouth. The oronasal face cover 2 has a breathing cavity 4 in which the user breathes.

The regulator assembly 1 comprises a support 10, a regulator, and a mode selection knob 20 pivotably mounted on the support 10 around an axis of rotation Z. The axis of rotation Z is perpendicular to the support 10 and s extends according to the axial direction A. The term "axial" is defined with respect to the axis of rotation Z in the present application, except when another axis is explicitly mentioned. The axis of rotation Z and the axial direction A are coaxial and coincident.

The support 10 comprises a case 13 and a plate 14 arranged on the box 13 and able to close it. The case 13 is provided with a breathing gas supply orifice intended to receive the end of a hose to connect the regulator to a breathing gas source containing essentially oxygen.

The regulator is housed in the case 13. It operates according to three operating modes. In the first operating mode, called "EMERGENCY" mode, the regulator supplies the breathing cavity 4 only with breathing gas until reaching a slight overpressure in the breathing cavity 4 relative to the ambient pressure of the air in the cabin, this overpressure is generally comprised between 3 mbar and 30 mbar. In the most common overpressure values, between 3 to 7 mbar, this overpressure value is hardly felt by the user. Beyond 10 to 12 mbar, the overpressure requires a substantial additional effort from the user to breathe which is quickly felt by the user.

In the second operating mode, called "100%" mode, the regulator supplies the breathing cavity 4 only with breathing gas until substantially reaching the ambient pressure. In practice, it is generally useful to plan to stop the supply of the breathing cavity before the breathing cavity reaches the ambient pressure, so that there is a very slight depression (a few tenths of a mbar to a few mbar) in the breathing cavity 4.

The third breathing mode, called "NORMAL", differs from the second breathing mode in that the breathing cavity 4 is supplied with breathing gas diluted with air, generally ambient air, the proportion of which is usually a function in particular the pressure in the cabin 8.

Figure 3:
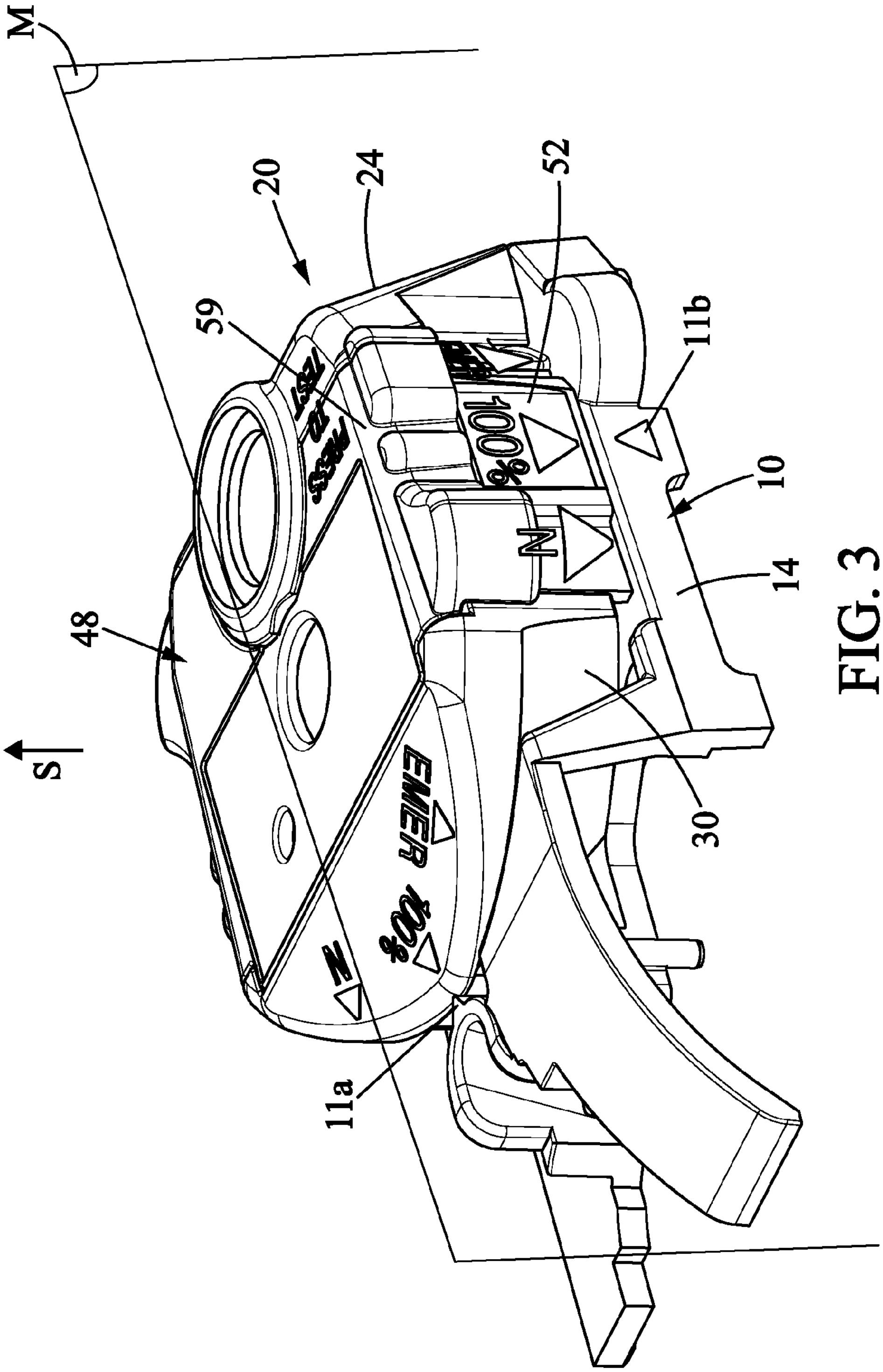
FIG. 3 is a perspective view from one side of the mode selection knob and of the support, in a locked position.

Referring to FIG. 3, the mode selection knob 20 has a first position indicated "EMER" and setting the regulator to operate in the first mode. The mode selection knob 20 has a second position indicated "100%" and setting the regulator to operate in the second mode. The mode selection knob 20 has a third position indicated "N" and setting the regulator to operate in the third mode.

In the illustrated embodiment, the axis of rotation Z of the selection knob extends substantially vertically when the user keeps his head vertically, so that the mode selection knob 20 extends under the case 13. Of course, the mode selection knob 20 may be placed differently, in particular on the front of the case 13 and/or with an axis of rotation extending substantially horizontally. In a known manner, the three positions of the mode selection knob are discrete positions materialized by notches.

A marker 11 a is disposed at the center of the width of the plate 14. To facilitate understanding of the present invention, a midplane M is defined. This midplane M passes through the marker 11*a* and through the axis of rotation Z. The midplane M is perpendicular to the support 10.

The front face of the mode selection knob includes three markings indicating the angular position of the mode selection knob with respect to the support 10. The positions of the mode selection knob are disposed according to a circle arc. The center of this circle arc is positioned on the axis of rotation Z. The second position indicated "100%" is located between the first position "EMER" and the third position indicated "N".

In the represented embodiment, the first position "EMER" is marked on one side of the midplane, hereinafter called the left side and the third position "N" is marked on the other side of the midplane, hereinafter called the right side.

To allow viewing of the mode selection position 20 from the side, three markings are marked on the lateral walls of the mode selection knob and two lateral markers 11*b* are marked on the edges of the plate 14.

Figure 5:
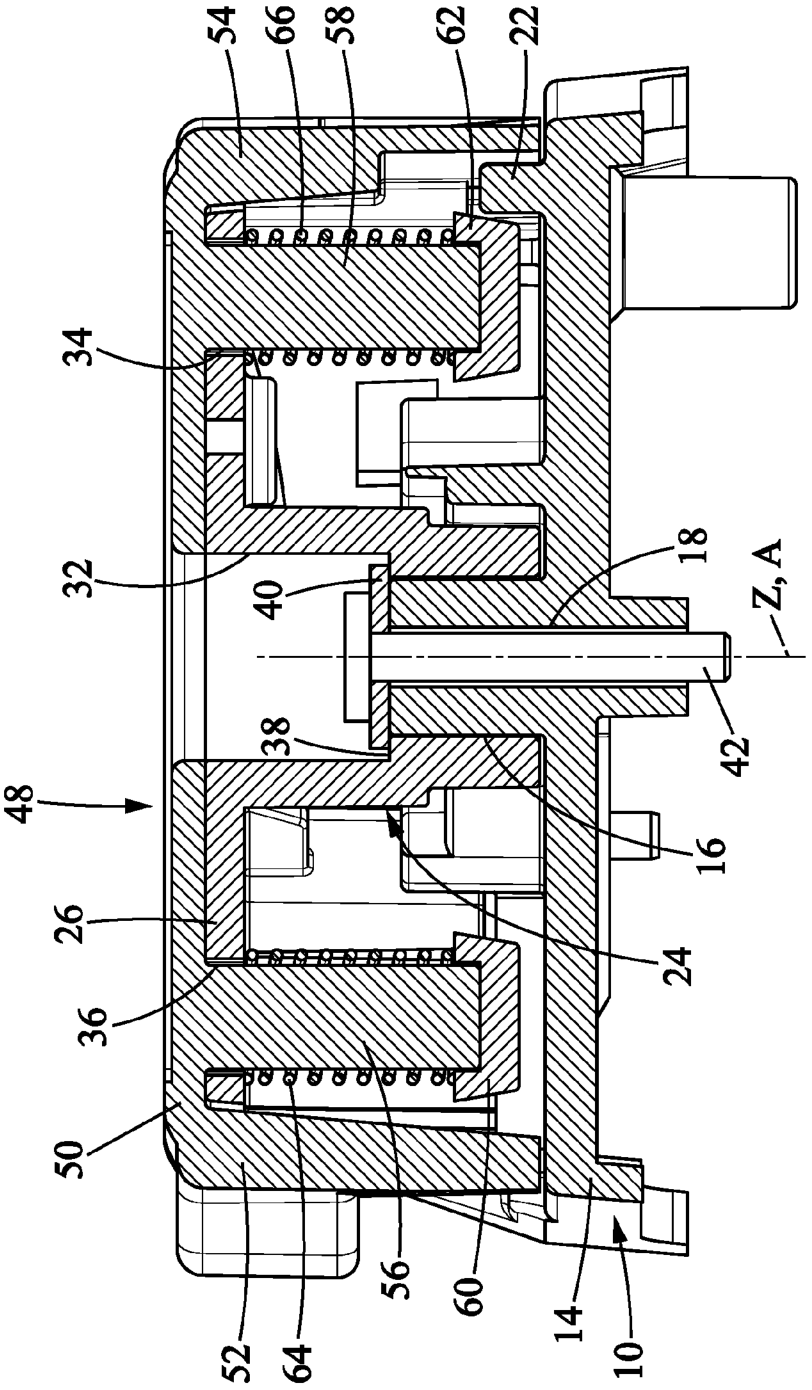
FIG. 5 is a sectional view of the selection knob and of the support, according to a section plane V-V illustrated in FIG. 4.
Figure 6:
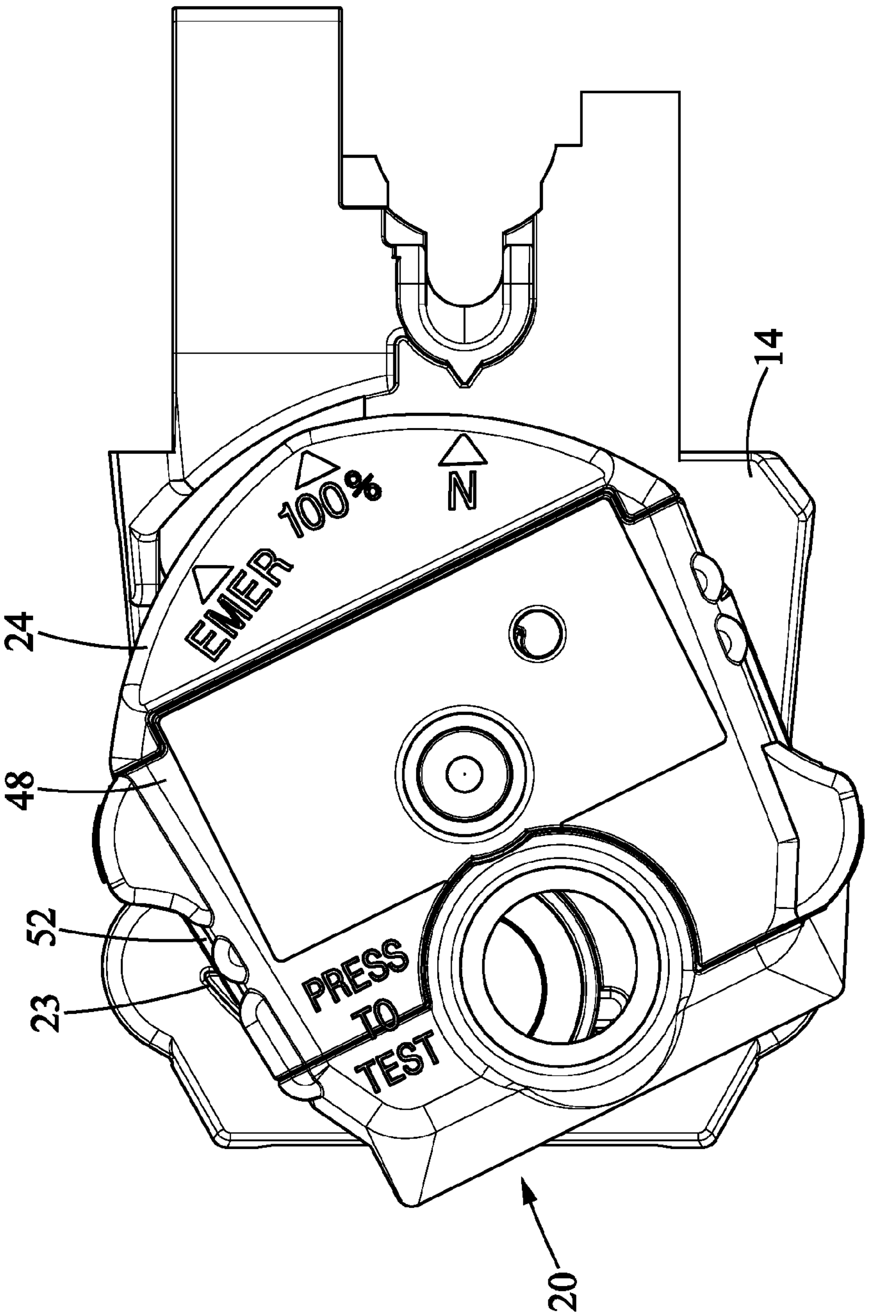
FIG. 6 is a top view of the mode selection knob, when the mode selection knob is the third position "N"
Figure 7:
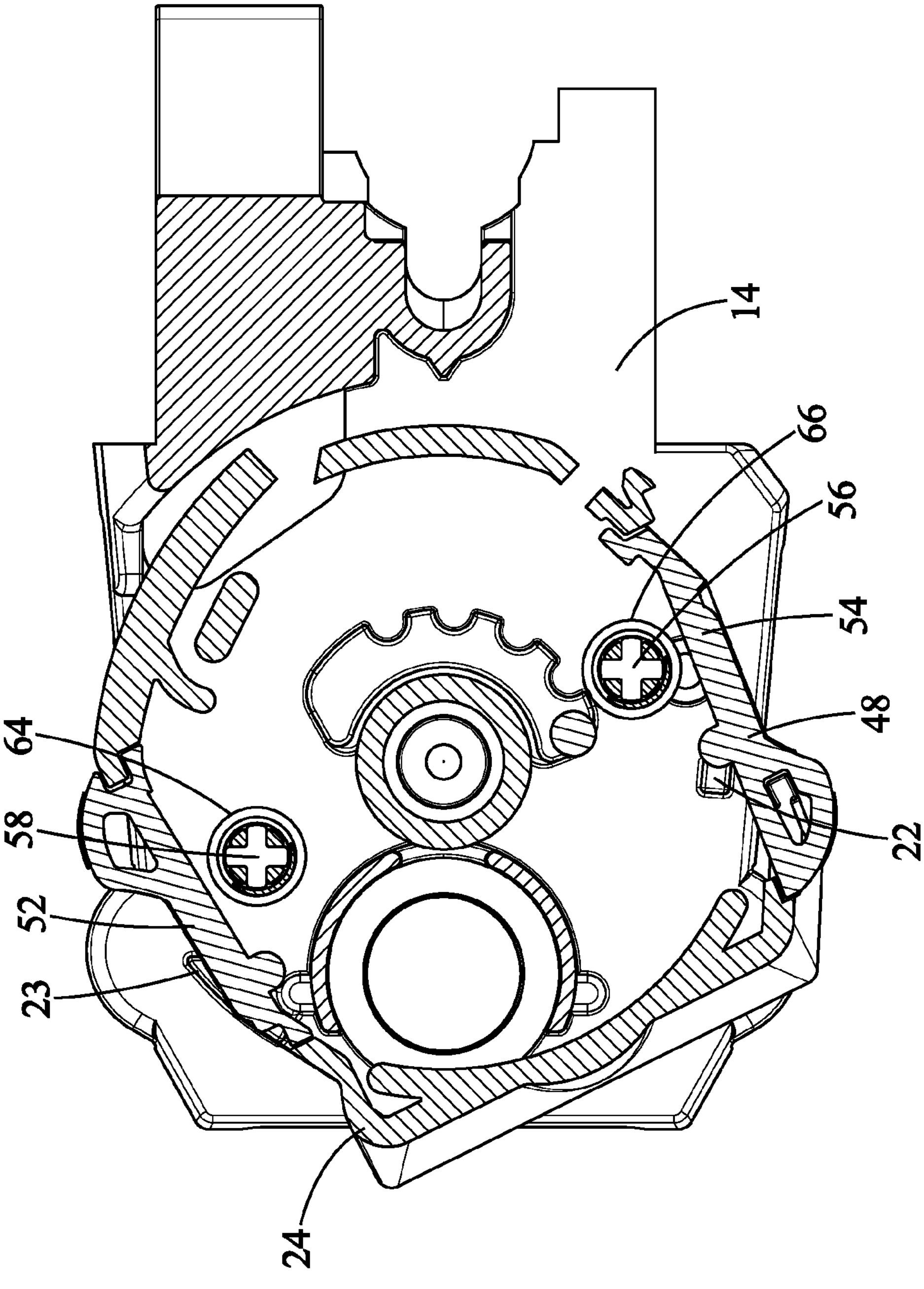
FIG. 7 is a sectional view of the mode selection knob and of the support, when the mode selection knob is in the third position "N"; the section plane being perpendicular to an axis of rotation Z of the mode selection knob.
Figure 8:
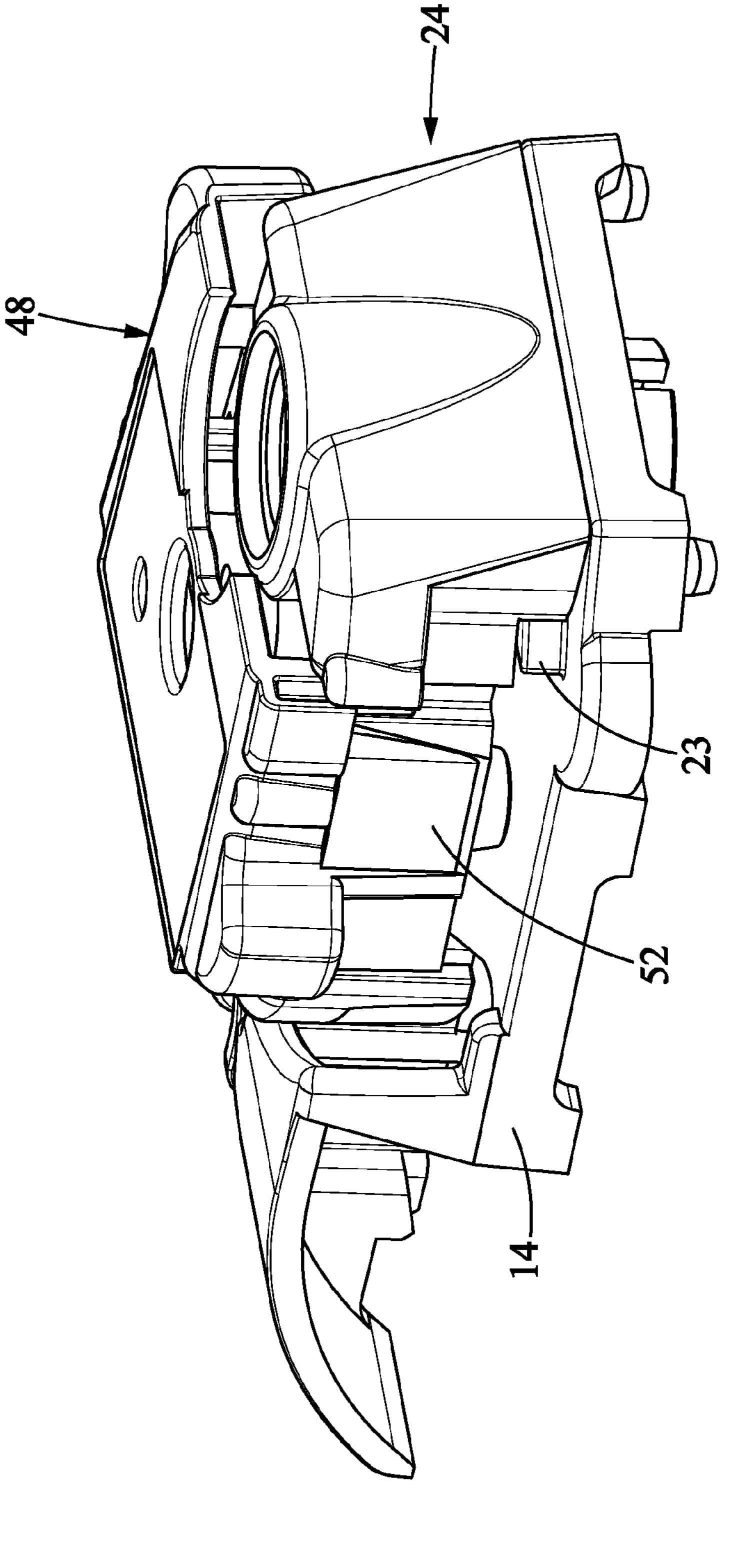
FIG. 8 is a perspective view from one side of a mode selection knob, in an unlocked position

Referring to FIG. 5, the plate 14 includes a hollow cylindrical body 16 extending according to the axial direction A above and below the plate 14. In the represented embodiment, the cylindrical body 16 is positioned at the center of the support. The cylindrical body 16 is provided with a through hole 18. The plate 14 also includes an axial projection 22 extending above the plate. In the represented embodiment, the axial projection 22 has a straight block like shape. The axial projection is located on the side of the midplane M opposite to the first position "EMER", i.e. on the right side. The axial projection 22 is positioned on the plate so as to be disposed under the axial wall 54, when the mode selection knob is in the third position "N", as shown in FIG. 7. Referring to FIGS. 6 to 8, the plate 14 may also include an additional axial projection 23 extending above the plate. The additional axial projection 23 is located on the other side of the midplane M with respect to the side containing the axial projection 22. The additional axial projection 23 is positioned on the plate so as to be disposed under the axial wall 52 when the mode selection knob is in the third position "N", as shown in FIG. 7. Advantageously, the additional axial projection has an elongated straight block like shape to provide a larger bearing surface for the axial wall 52.

Referring to FIGS. 2 to 5, the mode selection knob 20 includes a base 24 supported by the support 10, and a cover 48 supported by the base.

The base 24 includes a plate 26 extending parallel to the support 10, two peripheral flanges 28, 30 and a central crown 32 extending axially in the direction of the support. The plate 26 is able to support the cover 48. It comprises two axial holes 34, 36 disposed on either side of the central crown. The axial holes 34 have a shape corresponding to the shape of the axial profiled sections described hereinafter. Thus, in the embodiment represented in the figures, the axial holes 34 have a cross-like shape.

This shape is in no way limiting.

The central crown 32 is mounted movable in rotation around the cylindrical body 16. The central crown 32 is provided with an internal shoulder 38. A washer 40 with a diameter larger than the diameter of the cylindrical body 16 is arranged on the cylindrical body and over a portion of the internal shoulder 38. A fastening screw 42 is screwed into a threaded metal insert of the case 13. The axis of the fastening screw forms the axis of rotation Z of the selection knob 20.

The peripheral flanges 28, 30 extend axially in the direction of the support 10 along two opposite transverse faces of the mode selection knob. Two openings 44, 46 are arranged between the two peripheral flanges. In the represented embodiment, the openings 44, 46 are disposed laterally to the mode selection knob.

The cover 48 includes a bottom 50 extending parallel to the plate 14 of the support, two axial walls 52, 54, two axial profiled sections 56, 58 and two support caps 60, 62.

The bottom 50 is arranged against the plate 26 when the mode selection knob 20 is in the locked position. The two axial walls 52, 54 extend according to an axial direction A in the direction of the support. Each axial wall borders only one portion 59 of the peripheral edge of the bottom. The axial walls 52, 54 are disposed opposite each other. The axial walls 52, 54 cover all openings 44, 46 of the base when the cover 48 is in the locked position. A portion of the openings 44, 46 is uncovered when the cover 48 is in the unlocked position. Advantageously, in the represented embodiment, the two axial walls 52, 54 are parallel to each other and parallel to the midplane M. The two axial walls 52, 54 are positioned laterally to the mode selection knob.

The two axial profiled sections 56, 58 pass through the axial holes 34, 36 of the plate of the base. Each support cap 60, 62 is mounted at the free end of each axial profiled section. The diameter of each support cap 60, 62 is larger than the diameter of each axial profiled section 56, 58.

In the represented embodiment, the axial profiled sections 56, 58 have four branches 68 which intersect. The support caps 60, 62 include legs 70 able to be wedged between said branches of the axial profiled sections.

The mode selection knob 20 also includes two elastic elements 64, 66 able to act between the base 24 and the cover 48 to hold the cover in the locked position. An elastic element 64, 66 is arranged around each axial profile. Each elastic element 64, 66 bears against the support cap 60, 62 and the plate 26 of the base. For example, the elastic elements may consist of compression springs.

The axial holes 34, 36 formed in the plate 26 form two sliding devices. The axial profiled sections 56, 58, the elastic elements 64, 68 and the support caps 60, 62 form two complementary sliding devices. The sliding devices are able to cooperate with the complementary sliding devices to enable the movement of the cover 48 relative to the base 24 according to the axial direction A between the locked position and the unlocked position.

The sliding devices and the complementary sliding devices also allow fastening the cover to the base.

Alternatively, the cover 48 includes a unique axial wall.

Alternatively, the mode selection knob includes a single sliding device and a single complementary sliding device.

Alternatively, the mode selection knob includes more than two sliding devices and more than two complementary sliding devices.

In operation, the cover 48 is movable according to the axial direction A relative to the base 24 between a locked position of the mode selection knob 20 and an unlocked position of the mode selection knob.

The locked position is illustrated in FIGS. 3 and 5. The locked position locks the rotation of the mode selection knob 20 from the second position 100% to the third position N. In this position, the bottom of the cover 48 is in contact with the base 24. When the mode selection knob 20 is in the locked position and the wearer of the mask makes the mode selection knob pivot to the third position "N", the axial wall 54 abuts against the axial projection 22 and mechanically prevents the rotation of the mode selection knob. On the other hand, the wearer of the breathing mask 100 can make the mode selection knob pivot from the second position "100%" to the first position "EMER" by rotation of the base-cover assembly about the axis of rotation Z.

Figure 4:
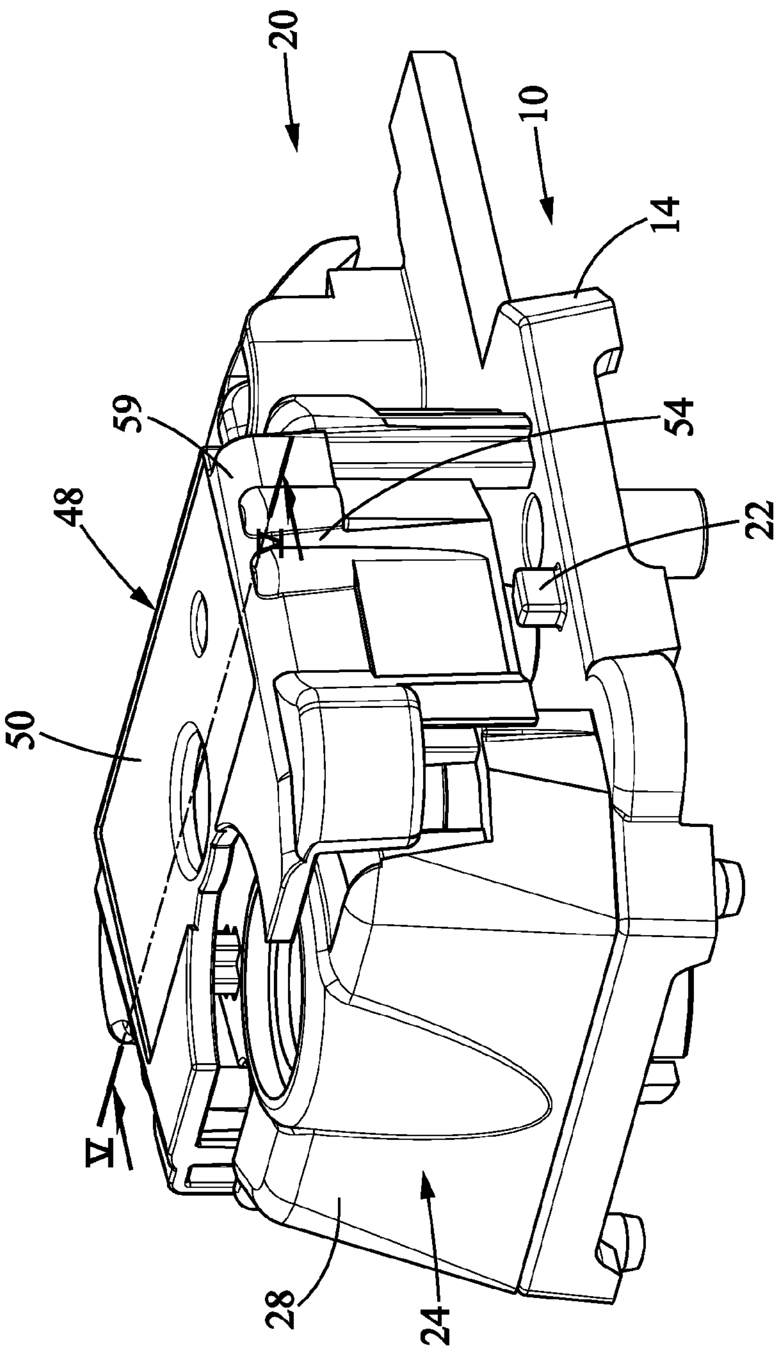
FIG. 4 is a perspective view from another side of the mode selection knob and of the support, in an unlocked position.

To set the mode selection knob in the unlocked position, the wearer of the mask pulls the cover in a direction S directed according to the axial direction A and outwards of the mode selection knob. The bottom of the cover is at a distance from the base. The elastic elements 64, 66 are compressed. The axial walls 52, 54 are moved outwards so that a portion of the openings 44, 46 is uncovered. In this unlocked position, the free end of the axial wall 54 is located above the axial projection 22. The unlocked position is illustrated in FIG. 4. If the wearer of the mask makes the mode selection knob pivot to the third position "N", the axial wall 54 pivots away from the axial projection 22. In particular, the axial wall 54 pivots above the axial projection 22. The axial projection 22 passes throughout the opening 44, when the cover 48 is in the unlocked position and the mode selection knob 20 pivots to the third position "N", as illustrated in FIG. 6.

Thus, the unlocked position enables the rotation of the mode selection knob from the second position "100%" to the third position "N".

When the N mode is selected; the user releases the cover 48 which, under the effect of the elastic elements 64, 66, returns to bear on the two axial projections 22, 23. In this manner, the cover 48 remains in an unlocked position and the user will not have to raise it again to return from the third position "N" to the second position "100%".

During this rotation, as soon as the walls 54 and 56 no longer bear on the two axial projections 22, 23, the elastic elements 64, 66 return the cover 48 to the locked position. Advantageously, in the event of an emergency, this bearing on the axial projections 22, 23 allows switching unhindered from the third position "N" into the first position "EMER".

The invention claimed is:

1. A regulator assembly for an aircrew breathing mask, the regulator assembly comprising:

a support;

a mode selection knob able to be moved between at least a first position, a second position, and a third position, the second position being positioned between the first position and the third position; and a regulator configured to be supplied by a breathing gas source and configured to supply a breathing cavity with the breathing gas at least in the following three operating modes:

when the mode selection knob is in the first position, the regulator supplies the breathing cavity as long as the pressure in the breathing cavity is not higher than a first relative pressure with respect to the ambient pressure;

when the mode selection knob is in the second position, the regulator supplies the breathing cavity as long as the pressure in the breathing cavity is not higher than a second relative pressure with respect to the ambient pressure, the first pressure being higher than the second pressure; and when the mode selection knob is in the third position, the regulator supplies the breathing cavity with breathing gas diluted with air, wherein the mode selection knob includes a base pivotably mounted on the support relative to an axis of rotation, and a cover supported by the base, wherein the axis of rotation is perpendicular to the support and extends in an axial direction, and wherein the cover is movable in the axial direction relative to the base between a locked position of the mode selection knob and an unlocked position of the mode selection knob, wherein the locked position prevents the mode selection knob from being pivoted from the second position to the third position while allowing the mode selection knob to be pivoted from the second position to the first position, and wherein the unlocked position permits the mode selection knob to be pivoted from the second position to the third position.

2. The regulator assembly of claim 1, wherein:

the support includes at least one axial projection;

the cover includes a bottom, and at least one axial wall supported by the bottom, the at least one axial wall configured to abut against the at least one axial projection when the cover is positioned in the locked position, preventing the mode selection knob from being pivoted from the second position to the third position; and the at least one axial wall being able is configured to be spaced away from the at least one axial projection when the cover is positioned in the unlocked position, permitting the mode selection knob to be pivoted from the second position to the third position.

3. The regulator assembly of claim 2, wherein:

the base includes a plate extending parallel to the support;

the bottom is configured to bear against the plate when the mode selection knob is in the locked position; and the base comprises a sliding device and the cover comprises a complementary sliding device configured to cooperate with the sliding device of the base to enable movement of the cover relative to the base in the axial direction between the locked position and the unlocked position.

4. The regulator assembly of claim 3, wherein the plate has only two peripheral flanges, at least one opening being arranged between the two peripheral flanges, and wherein the at least one axial wall of the cover covers the at least one opening; the at least one axial projection configured to pass through the at least one opening, when the cover is in the unlocked position and the mode selection knob is pivoted to the third position.

5. The regulator assembly of claim 3, wherein the sliding device of the base includes at least one axial hole arranged in the plate, and wherein the complementary sliding device comprises at least one axial profiled section extending perpendicular to the bottom, the at least one axial profiled section configured to slide in the at least one axial hole, when the cover is moved from the locked position to the unlocked position.

6. The regulator assembly of claim 5, wherein the at least one axial profiled section has at least three branches which intersect, and wherein the at least one support cap includes legs configured to be wedged between the branches of the at least one axial profiled section.

7. The regulator assembly of claim 2, wherein the cover is configured to be pulled in a direction directed away from the base of the mode selection knob to set the cover into the unlocked position, and wherein the at least one axial wall is configured to pivot above the at least one axial projection when the cover is positioned in the unlocked position and the mode selection knob is pivoted from the second position to the third position.

8. The regulator assembly of claim 2, wherein the at least one axial wall borders only a portion of a peripheral edge of the bottom.

9. The regulator assembly of claim 2, wherein the cover includes two axial walls parallel to each other and parallel to a midplane, the midplane containing the axis of rotation.

10. The regulator assembly of claim 9, wherein the support includes first axial projection and a second axial projection, the first axial projection disposed on one side of the midplane, the second axial projection being disposed on the other side of the midplane, the axial projections being positioned such that the axial walls are disposed above the axial projections when the mode selection knob is positioned in the third position.

11. The regulator assembly of claim 1, wherein the mode selection knob includes at least one elastic element configured to act between the base and the cover to hold the cover in the locked position.

12. The regulator assembly of claim 11, wherein:

the sliding device of the base includes at least one axial hole arranged in the plate;

the complementary sliding device comprises at least one axial profiled section extending perpendicular to the bottom, the at least one axial profiled section configured to slide in the at least one axial hole, when the cover is moved from the locked position to the unlocked position;

the complementary sliding device comprises at least one support cap configured to be fastened to a free end of the at least one axial profiled section, the at least one axial profiled section having a diameter;

the support cap has a diameter larger than the diameter of the at least one axial profiled section; and wherein the elastic element bears on the one hand against the at least one support cap and on the other hand against the plate.

* * * * *